(12) United States Patent
Huang et al.

(10) Patent No.: US 10,313,914 B2
(45) Date of Patent: Jun. 4, 2019

(54) SYSTEM AND METHOD FOR REGISTRATION, MONITORING, AND NOTIFICATIONS REGARDING GROUPS OF INTERNET-OF-THINGS (IOT) DEVICES

(71) Applicant: Verizon Patent and Licensing Inc., Arlington, VA (US)

(72) Inventors: Ye Huang, San Ramon, CA (US); Sudhakar Reddy Patil, Westlake, TX (US); James Mathison, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 15/457,593

(22) Filed: Mar. 13, 2017

(65) Prior Publication Data
US 2018/0262941 A1    Sep. 13, 2018

(51) Int. Cl.
*H04W 28/02* (2009.01)
*H04L 12/24* (2006.01)
*H04L 29/08* (2006.01)
*H04W 52/02* (2009.01)
*H04W 8/04* (2009.01)
*H04W 4/70* (2018.01)
*H04L 12/26* (2006.01)

(52) U.S. Cl.
CPC ..... *H04W 28/0221* (2013.01); *H04L 41/0893* (2013.01); *H04L 43/08* (2013.01); *H04L 67/125* (2013.01); *H04W 4/70* (2018.02); *H04W 8/04* (2013.01); *H04W 52/0216* (2013.01); *Y02D 70/00* (2018.01); *Y02D 70/144* (2018.01); *Y02D 70/21* (2018.01); *Y02D 70/24* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 7,844,294 B1 * | 11/2010 | Manroa | G06Q 10/10 455/518 |
| 9,781,259 B1 * | 10/2017 | Kodaypak | H04M 3/42357 |
| 10,182,304 B2 * | 1/2019 | Vyas | H04W 4/50 |
| 2011/0040863 A1 * | 2/2011 | Griffin | H04L 67/1095 709/223 |

(Continued)

*Primary Examiner* — Jeffrey M Rutkowski
*Assistant Examiner* — Andre G Tacdiran

(57) ABSTRACT

Techniques described herein may be used to enable a wireless telecommunication network to provide notification to external devices (such as application servers) regarding Internet-of-Things (IoT) devices attached to the network. A customer may create a notification subscription regarding a group of IoT devices attached to the network. The subscription may identify the IoT devices, the events for which the customer would like to be notified, and an application server that is to receive the notifications (e.g., the IoT devices becoming available to send and receive information), and the application server that is to receive the notifications. The network may monitor the group of IoT devices for the events included in the subscription and may notify the application server if/when the events occur. In response, the application server may communicate with the IoT devices via the network.

20 Claims, 7 Drawing Sheets

(56) References Cited

U.S. PATENT DOCUMENTS

| | | | |
|---|---|---|---|
| 2014/0307647 A1* | 10/2014 | Yang | H04W 4/08 370/329 |
| 2015/0113172 A1* | 4/2015 | Johnson | H04L 67/34 709/245 |
| 2016/0007138 A1* | 1/2016 | Palanisamy | H04W 4/70 455/41.2 |
| 2016/0087933 A1* | 3/2016 | Johnson | H04W 4/70 709/245 |
| 2016/0100362 A1* | 4/2016 | Palanisamy | H04W 52/0212 370/311 |
| 2016/0301673 A1* | 10/2016 | Yu | H04W 4/70 |
| 2017/0041794 A1* | 2/2017 | Lee | H04W 12/08 |
| 2017/0048336 A1* | 2/2017 | Novo Diaz | H04L 67/16 |
| 2017/0237815 A1* | 8/2017 | Arsenault | H04W 4/70 709/217 |
| 2017/0347283 A1* | 11/2017 | Kodaypak | H04W 4/70 |
| 2017/0366423 A1* | 12/2017 | Griot | H04L 43/062 |
| 2018/0020369 A1* | 1/2018 | Parra | H04W 4/70 |
| 2018/0035351 A1* | 2/2018 | Kodaypak | H04W 76/10 |
| 2018/0054796 A1* | 2/2018 | Edge | H04W 4/02 |
| 2018/0063763 A1* | 3/2018 | Gupta | H04W 16/08 |
| 2018/0103427 A1* | 4/2018 | Griot | H04W 52/0216 |
| 2018/0124544 A1* | 5/2018 | Gupta | H04L 67/06 |
| 2018/0152984 A1* | 5/2018 | Palanisamy | H04W 8/18 |
| 2018/0375902 A1* | 12/2018 | Wong | H04W 52/02 |

* cited by examiner

SYSTEM AND METHOD FOR REGISTRATION, MONITORING, AND NOTIFICATIONS REGARDING GROUPS OF INTERNET-OF-THINGS (IOT) DEVICES

BACKGROUND

Wireless telecommunication networks may provide network services for different types of User Equipment (UE). An example of such devices may include smartphone, tablet computers, and other devices that are configured to utilize the broadband capabilities of wireless telecommunication networks. Another example of such devices may include Internet-of-Things (IoT) devices. Relative to other types of UEs, IoT devices may be designed for specific implementations and, therefore, have relatively limited data processing, memory, storage, and/or wireless communication capabilities. Examples of IoT devices may include tracking devices (e.g., pet or vehicle tracking devices), environmental monitoring (e.g., precipitation, seismic, temperature, etc.) devices, medical implant (e.g., heart monitors, blood pressure monitors, etc.) devices, home automation (e.g., to home lighting, heating, and security) devices, vending machines, utility meters, parking meters, and more.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1:
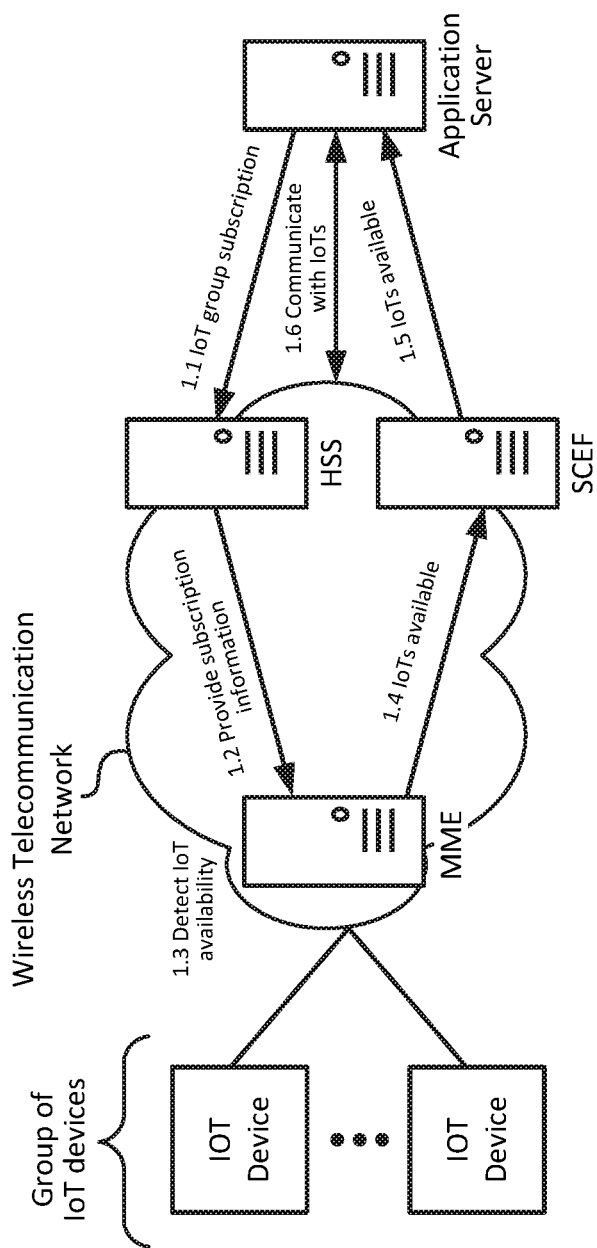
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

An Internet-of-Things (IoT) device may have long-term battery requirements (e.g., a battery that lasts from 8-10 years). To accommodate such requirements, IoT devices may be designed to conserve battery power by implementing techniques, such as remaining in a Power Saving Mode (PSM) for extended periods of time, limiting communications with a wireless telecommunication network (e.g., via Extended Discontinuous Reception (eDRX), etc.). As a result, IoT devices may only be periodically available to receive information (e.g., user plane message and/or control plane messages) via the network. To help ensure that devices, such as an application server, may communicate with the IoT device when the IoT device becomes available, the network may implement a Service Capability Exposure Function (SCEF), which may enable an application server to register a particular IoT device with a Home Subscriber Server (HSS) so that the application server is notified when the IoT device becomes available to receive information from the application server.

This approach may include certain limitations, such as creating a significant amount of network traffic and congestion. For example, each IoT device may be individually registered with the network so that when the IoT device becomes available to send and receive information, an application server that was registered along with the IoT device, may be notified. In response to the notification, the application server may communicate with the IoT device. While such an approach enables IoT devices and application servers to communicate, such an approach results in significant network congestion and overhead when a large number (e.g., millions) of IoT devices are implemented. The congestion can give rise to slower data rates, wasted messages (e.g., message sent when IoT devices are not available), and other problems, which may, in turn, result in an inefficient use of network resources, require IoT devices to be active for longer and use more battery power. In addition, such an approach can be a burden on customers (e.g., organizations implementing, managing, and maintaining the IoT devices) since each IoT device may need to be registered and managed individually.

Techniques described herein may be used to enable IoT devices to be registered, deployed, and managed on a group-level-basis. For instance, an organization (such as a business) intending to deploy multiple IoT devices may register for a notification service whereby the IoT devices may be registered as a group and events for which the organization (or an application operated by the organization) would like to be notified can be specified. An example of such an event may include the IoT device exiting from a PSM and becoming available to send and receive information. Additional examples of such an event may include a loss of connectivity, establishing (or losing) Short Messaging Service (SMS) connectivity, etc. In accordance with the notification subscription, the network may monitor the group of IoT devices for the events specified and notify the organization if/when the events occur. As such, resources of the organization (e.g., an application server of the organization) may continuously monitor a status of the IoT devices and/or help conserve network resources by only communicating (or attempting to communicate) with the IoT devices if/when they become available. Additional benefits of the techniques described herein may include reducing network traffic, a more efficient use of network resources, and greater conservation of battery power of the IoT devices.

FIG. 1 illustrates an example overview of an implementation described herein. As shown, an application server (or another computing device owned and operated by a customer of a wireless telecommunication network) may create a notification subscription regarding a group of IoT devices and receiving notifications regarding events corresponding to the group of IoT devices (at 1.1). The notification subscription may identify the IoT devices included in the group, the company (or other organization) requesting the notification subscription, the types of IoT events for which the company (e.g., the application server) would like to receive a notification, etc. Examples of such events may include the IoT devices entering and/or exiting a PSM, and thus becoming available and/or unavailable to communicate via the wireless telecommunication network. The notification subscription may be stored by a Home Subscriber Server (HSS) of the wireless telecommunications network.

The HSS may provide subscription information to a Mobile Management Entity (MME) to which IoT devices, of the group of IoT device, attach (at 1.2). Doing so may enable the MME device to monitor the IoT devices for the events described by the notification subscription. At some point, the MME may detect that such an event has occurred (e.g., that the IoT devices have exited a PSM and performed a Tracking Area Update (TAU)) (at 1.3). In response, the MME may notify a Service Capability Exposure Function (SCEF) of the wireless telecommunication network (1.4). The SCEF may, in turn, relay a notification to the application server that one of the IoT devices in the group is available (at 1.5). The notification from the SCEF may enable or cause the application server to communicate with the IoT device, via the wireless telecommunication network, while the IoT devices are available (at 1.6). Thus, the techniques described herein may enable a customer to register a group of IoT devices and define events for which the customer would like to receive notifications. Additional benefits of the techniques described herein may include reducing network traffic, a more efficient use of network resources, and greater conservation of battery power of the IoT devices.

Figure 2:
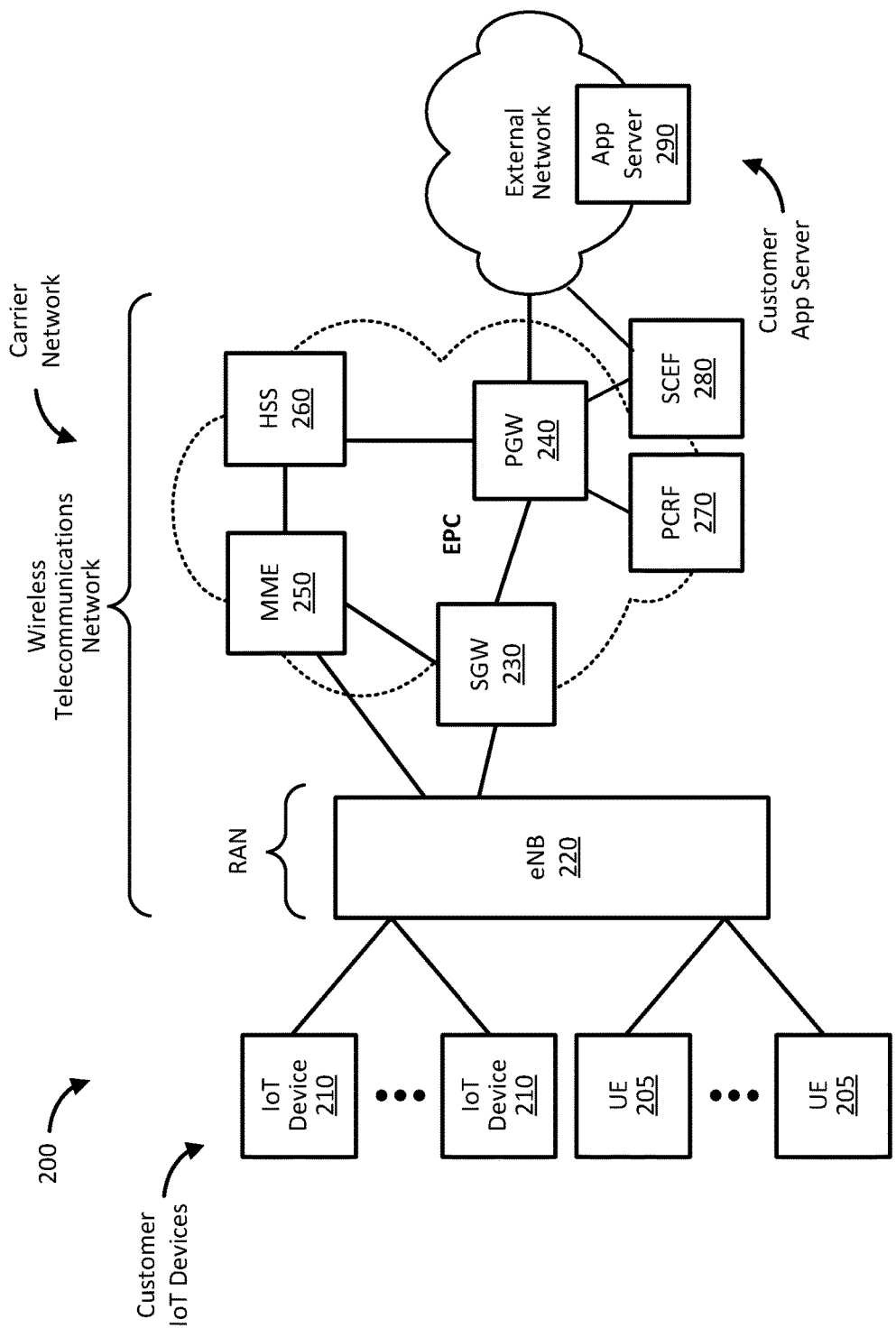
FIG. 2 is a diagram of an example environment in which systems and/or methods described herein may be implemented.

FIG. 2 illustrates an example environment 200 in which systems and/or methods described herein may be implemented. Environment 200 may include UEs 205, IoT devices 210, a wireless telecommunications network, and an external network with application server (app server) 290. The network may be, or may include, radio access networks (RANs) that include one or more base stations, some or all of which may take the form of enhanced Node Bs (eNBs) 220, via which UEs 205 and IoT devices 210 may communicate with the EPC network.

The EPC network may include Serving Gateway (SGW) 230, PDN Gateway (PGW) 240, Mobility Management Entity (MME) 250, Home Subscriber Server (HSS) 260, Policy and Charging Rules Function (PCRF) 270, and/or Service Capability Exposure Function (SCEF) 280. As shown, the EPC network may enable UEs 205 and IoT devices 210 to communicate with an external network, such as a Public Land Mobile Networks (PLMN), a Public Switched Telephone Network (PSTN), and/or an Internet Protocol (IP) network (e.g., the Internet).

UE 205 may include a portable computing and communication device, such as a personal digital assistant (PDA), a smart phone, a cellular phone, a laptop computer with connectivity to the wireless telecommunications network, a tablet computer, etc. UE 205 may also include a non-portable computing device, such as a desktop computer, a consumer or business appliance, or another device that has the ability to connect to a RAN of the wireless telecommunications network. UE 205 may also include a computing and communication device that may be worn by a user (also referred to as a wearable device) such as a watch, a fitness band, a necklace, glasses, an eyeglass, a ring, a belt, a headset, or another type of wearable device.

IoT device 210 may include a wireless computing and communication device capable of communicating with the wireless telecommunication network via eNB 220. IoT device 210 may be capable of collecting certain types of information and sending the information to application server 290 via the wireless telecommunication network. IoT device 210 may also receive information from application server 290. In some implementations, IoT device 210 may be configured to only communicate with the wireless telecommunication network and/or application server 290 periodically, and therefore, may be capable of implementing one or more types of power saving modes, data collection and/or communication schedules, and/or other techniques that may help prolong the duration for which a battery of IoT device 210 may last. Examples of IoT device 210 may include a device within a tracking devices (e.g., pet tracking devices), vehicle communication devices, environmental (e.g., precipitation, seismic, temperature, etc.) monitoring devices, medical implant devices (e.g., heart monitors, blood pressure monitors, etc.), home automation devices (e.g., to home lighting, heating, and security systems), vending machines, utility meters, parking meters, and more. IoT device 210 may include a machine-to-machine (M2M) services, a machine-type-communication (MTC) device, or another type of device that communicates with a wireless telecommunication network in a similar manner. In some implementations, while UE 205 is described above as more of a broadband type wireless device, it is possible that in some implementations, IoT device 210 may be considered/viewed as a type of UE 205.

eNB 220 may include one or more network devices that receives, processes, and/or transmits traffic destined for and/or received from IoT device 210 (e.g., via an air interface). eNB 220 may be connected to a network device, such as site router, that functions as an intermediary for information communicated between eNB 220 and the EPC.

SGW 230 may aggregate traffic received from one or more eNBs 220 and may send the aggregated traffic to an external network or device via PGW 240. Additionally, SGW 230 may aggregate traffic received from one or more PGWs 240 and may send the aggregated traffic to one or more eNBs 220. SGW 230 may operate as an anchor for the user plane during inter-eNB handovers and as an anchor for mobility between different telecommunication networks. PGW 240 may include one or more network devices that may aggregate traffic received from one or more SGWs 230, and may send the aggregated traffic to an external network. PGW 240 may also, or alternatively, receive traffic from the external network and may send the traffic toward IoT device 210 (via SGW 230 and/or eNB 220).

MME 250 may include one or more computation and communication devices that act as a control node for eNB 220 and/or other devices that provide the air interface for the wireless telecommunications network. For example, MME 250 may perform operations to register IoT device 210 with the wireless telecommunications network, to establish bearer channels (e.g., traffic flows) associated with a session with IoT device 210, to hand off IoT device 210 to a different eNB, MME, or another network, and/or to perform other operations. MME 250 may perform policing operations on traffic destined for and/or received from IoT device 210.

In some implementations, MME 250 may perform one or more of the operations described herein. For example, MME 250 may receive information, from HSS 260, regarding IoT devices 210 and/or IoT events for which app server 290 is to be notified. Additionally, MME 250 may monitor IoT devices 210, detect when an IoT event (to which app server 290 is subscribed) has occurred, and notify app server 290 (via SCEF 280) of the IoT event.

HSS 260 may include one or more devices that may manage, update, and/or store, in a memory associated with HSS 260, profile information associated with a subscriber (e.g., a subscriber associated with IoT device 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with IoT device 210. Additionally, or alternatively, HSS 260 may perform authentication, authorization, and/or accounting operations associated with the subscriber and/or a communication session with IoT device 210.

In some implementations, HSS 260 may perform one or more of the operations described herein. For example, HSS 260 may receive (e.g., from app server 290) information describing a group of IoT devices 210 and/or IoT events for which app server 290 should be notified (e.g., when IoT devices 210 of the group exit a power save mode and are ready to communication with app server 290). Additionally, HSS 260 may provide the information, regarding individual IoT devices and corresponding IoT device events (of an IoT device group), to appropriate MMEs 250 (e.g., MMEs 250 to which a particular IoT device has performed an attach procedure).

PCRF 270 may receive information regarding policies and/or subscriptions from one or more sources, such as subscriber databases and/or from one or more users. PCRF 270 may provide these policies to PGW 240 or another device so that the policies can be enforced. As depicted, in some implementations, PCRF 270 may communicate with PGW 240 to ensure that charging policies are properly applied to locally routed sessions within the telecommunications network.

SCEF 280 may include one or more server devices that communicates with app server 290 regarding IoT device 210. For example, SCEF 280 may receive a notification, from MME 250, about a particular IoT device 210 that has become available for communication (e.g., an IoT device 110 that has just exited a power saving mode). In turn, SCEF 280 may relay the notification to an appropriate app server 290 so that the app server 290 might communicate with the particular IoT device 210 while the IoT device 210 is available. Additional examples of operations that maybe performed by SCEF 280 are discussed below with reference to FIGS. 5 and 6.

In some implementations, the wireless telecommunication network may be owned and operated by a carrier organization, while IoT devices 210 and app server 290 may be owned and operated by a customer of the carrier organization (e.g., a customer requesting the IoT device event notification services described herein). Additionally, in some implementations, environment 200 may include one or more additional devices. For example, as described below in FIG. 5, the EPC network may include a Business Support System (BSS) that may include one or more server devices configured to provide billing services for customer organizations that have subscribed to the IoT device event notification services described herein. Additionally, as is also described in FIG. 5, the EPC network may include an Enterprise Gateway (GW) device that may include one or more server devices that may provide a portal for subscribing for, and managing, IoT device groups, IoT devices, IoT device events, and/or IoT device event notifications services described herein. In some implementations, the enterprise GW may also, or alternatively, include a portal through which app server 290 may provide information, via the wireless telecommunication network, to IoT devices 210. In some implementations, the functionality of such devices (e.g., the BSS and Enterprise GW device) may be provided by one or more of the other devices described in FIG. 2.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc.

Alternatively, or additionally, one or more of the devices of environment 200 may perform one or more functions described as being performed by another one or more of the devices of environment 200. Additionally, the devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections may be shown between certain devices in FIG. 2, some of said devices may, in practice, communicate with each other via one or more additional devices and/or networks.

Figure 3:
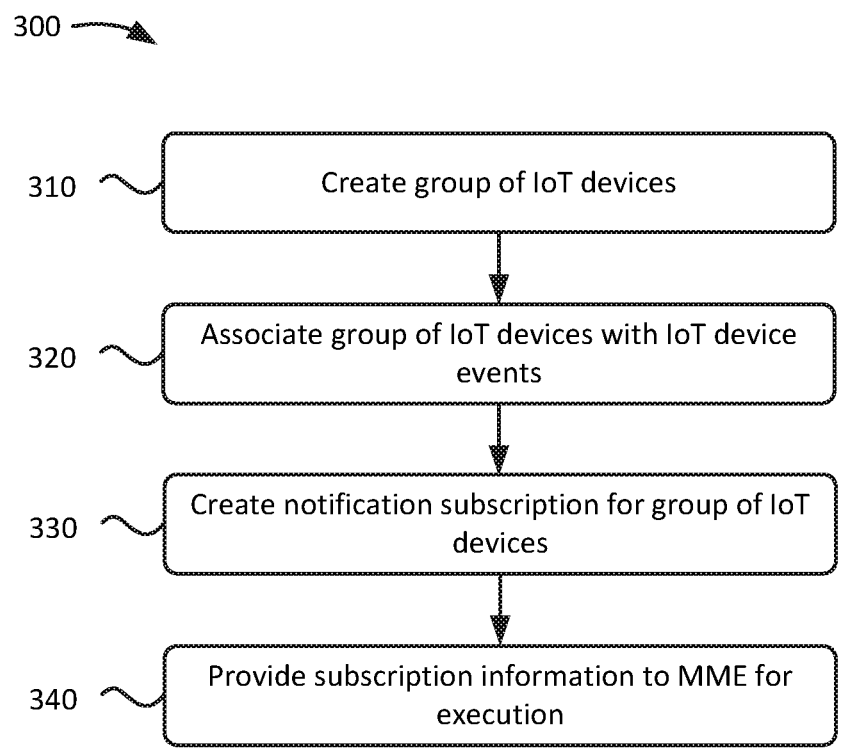
FIG. 3 is a diagram of an example process for creating a notification subscription for a group of Internet-of-Things (IoT) devices.

FIG. 3 is a diagram of an example process 300 for creating a notification subscription for a group of IoT devices. In some implementations, process 300 may be performed by HSS 260. In some implementations, process 300 may be performed by one or more additional, or alternative, devices.

As shown, process 300 may include creating a group of IoT devices (block 310). For example, HSS 260 may receive a request to create a logical group of IoT devices. The request may include IDs (e.g., International Mobile Subscriber Identities (IMSIs), Mobile Device Numbers (MDNs), 3GPP external identifiers for MDN-less devices, etc.) corresponding to IoT devices 210 that are in the group, and creating the group of IoT devices may include creating an association between a group ID and the IoT devices. The group may also include an ID of an organization corresponding to the group of IoT devices. For example, a company that owns a group of IoT devices 210 (e.g., vending machines) may provide IDs, corresponding to the IoT devices 210, to a wireless telecommunication network, along with a request for the IoT devices 210 to be part of a logical group. In response, the network may create the group of IoT devices and store the group in HSS 260.

Process 300 may also include associating the group of IoT devices with IoT device events (block 320). For example, HSS 260 may receive information describing IoT events that are to be associated with the group of IoT devices. The IoT events may correspond to an availability of the IoT devices 210 to receive information from the wireless telecommunication network and/or application server 290. Examples of such events may include IoT device 210 engaging in an attach procedure (with the wireless telecommunication network), entering a power saving mode, exiting a power saving mode, performing a Tracking Area Update (TAU) procedure, etc.

Process 300 may include creating a notification subscription for the group of IoT devices (block 330). For example, after receiving information describing a group of IoT devices 210 and events corresponding to the group of IoT devices 210 for which notifications are requested, HSS 260 may create a notification subscription for providing notifications to a particular device (e.g., app server 290) whenever a particular IoT device 210, of the group of IoT devices, experiences, undergoes, etc., one of the IoT events. The notification subscription may include additional, and/or alternative, information, such as an entity (e.g., a business, a customer, etc.) to which the notification subscription corresponds, a duration for which the notification subscription may last, RANs that may correspond to the IoT devices 210, etc. The notification subscription may be stored by HSS 260.

Process 300 may include providing subscription information to MME for execution (block 340). For example, when a particular IoT device 210, corresponding to the group of IoT devices, is deployed, the particular IoT device 210 may perform an attach procedure that involves a particular eNB 220 of the wireless telecommunications network. Consistent with 3$^{rd}$ Generation Partnership Project (3GPP) Communication Standards, the attach procedure may include the IoT device 210 being associated with a particular MME 250, and the MME 250 communicating with HSS 260 to send/receive service information, for authentication and authorization purposes, etc. As part of the techniques described herein, during the attach procedure, HSS 260 may provide subscription information to the MME 250 so that, for example, the MME 250 may help provide the notification subscription services requested for the group of IoT devices. In some implementations, the subscription information may include an ID of a particular SCEF 280 to which notifications of IoT devices event messages should be sent, an ID of a group of IoT devices to which IoT device 210 pertains, a customer ID corresponding to the subscription, etc.

Figure 4:
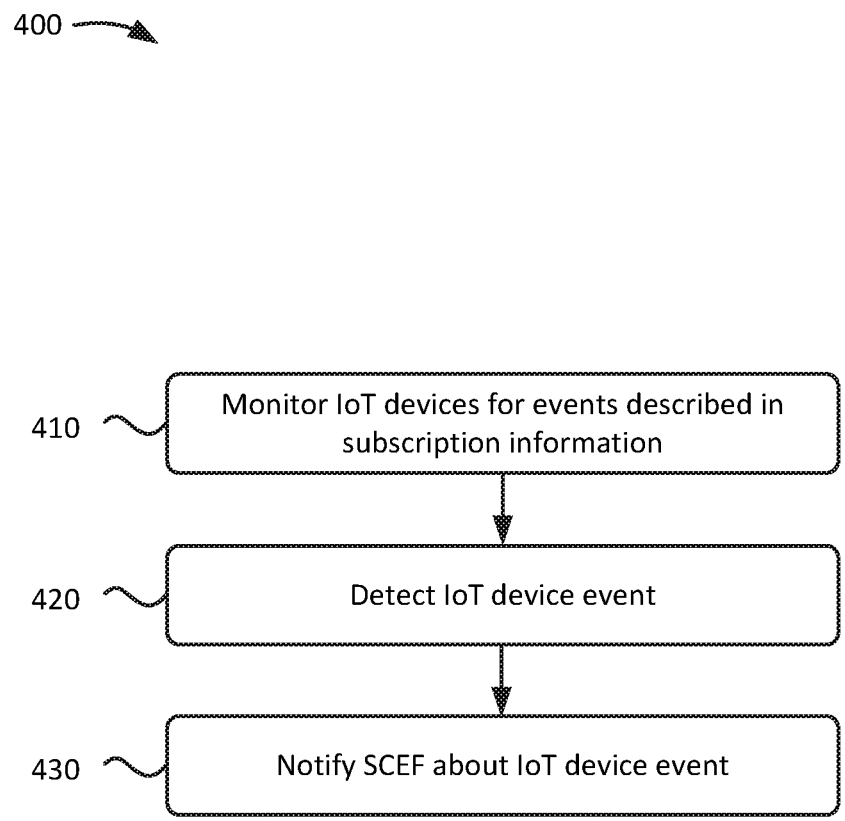
FIG. 4 is a diagram of an example process for executing a notification subscription for event notifications regarding a group of IoT devices.

FIG. 4 is a diagram of an example process 400 for executing a notification subscription for event notifications regarding a group of IoT devices. In some implementations, process 400 may be performed by MME 250. In some implementations, process 400 may be performed by one or more additional, or alternative, devices.

As shown, process 400 may include monitoring IoT devices 210 for events described in a notification subscription (block 410). For example, as described above with reference to block 340 of FIG. 3, MME 250 may have received subscription information corresponding to one or more IoT devices 210 belonging to a group of IoT devices. In accordance with the subscription information, MME 250 may monitor IoT devices 210 for events described (or otherwise associated with) the notification subscription (e.g., IoT device 210 entering a power saving mode, exiting a power saving mode, performing a Tracking Area Update (TAU) procedure, etc.).

Process 400 may also include detecting an IoT device event corresponding to a monitored IoT device 210 (block 420). For example, at some point in time, MME 250 may receive information indicative of an IoT device event that corresponds to the notification subscription received by MME 250. For example, IoT device 210, of an IoT device group may perform a TAU procedure, and MME 250 may detect the TAU procedure as one of the IoT device events of the notification subscription.

Process 400 may include notifying SCEF 280 about an IoT device event (block 430). For example, in response to detecting an IoT device event corresponding to a notification subscription, MME 250 may communicate the ID of IoT device 210, and/or a description of the IoT notification event, to SCEF 280. MME 250 may provide SCEF 280 with contextual information about IoT device 210 and/or the IoT device event. The contextual information may enable SCEF 280 to map an individual IoT device to a customer group and an app server 290. Additionally, the contextual information may be conveyed to SCEF 280 in an SCEF reference ID of the event notification message. Additionally, or alternatively, MME 250 may indicate to SCEF 280 whether the IoT device 210 is available to send and receive information and/or how long the IoT device 210 is expected to remain available. Notifying SCEF 280 of the IoT device event may cause SCEF 280 to contact the application server 290 associated with the IoT device 210 regarding the IoT device event and/or the availability of the particular IoT device 210, which (in turn) may cause the applications server 290 to begin communicating with the particular IoT device 210 (which may be via SCEF 280).

Once the application server has been alerted to the availability of IoT device 210, app server 290 may communicate with IoT device 210 via an Internet Protocol (IP) Packet Data Network (PDN) or a non-IP PDN. The IP PDN may include a communication pathway that includes PGW 240, SGW 230, and eNB 220. The non-IP PDN may include a communication pathway that includes SCEF 280, MME 250, and eNB 220.

Figure 5:
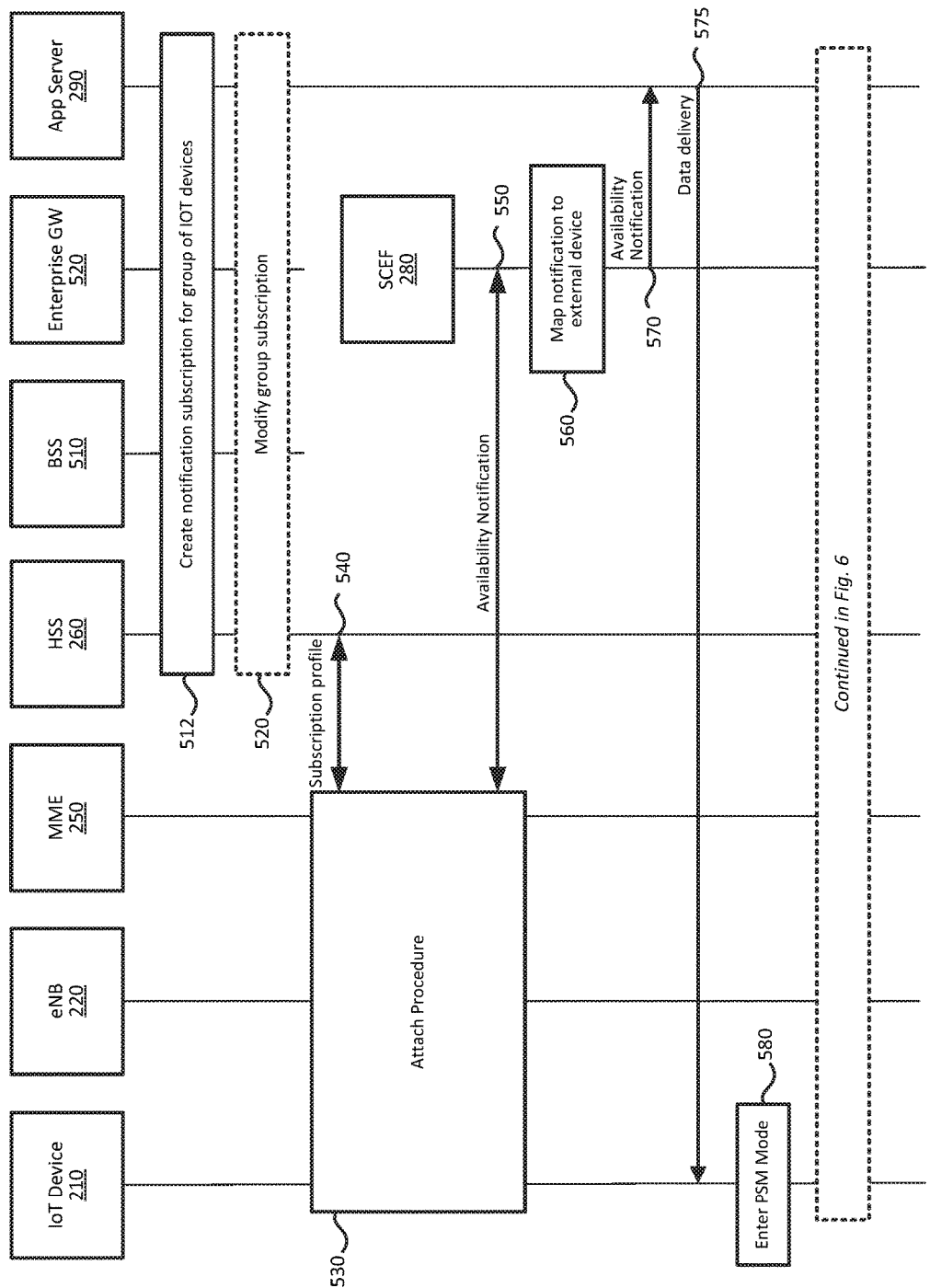
FIGS. 5 and 6 are diagrams of an example for providing IoT group registration and notification services.
Figure 6:
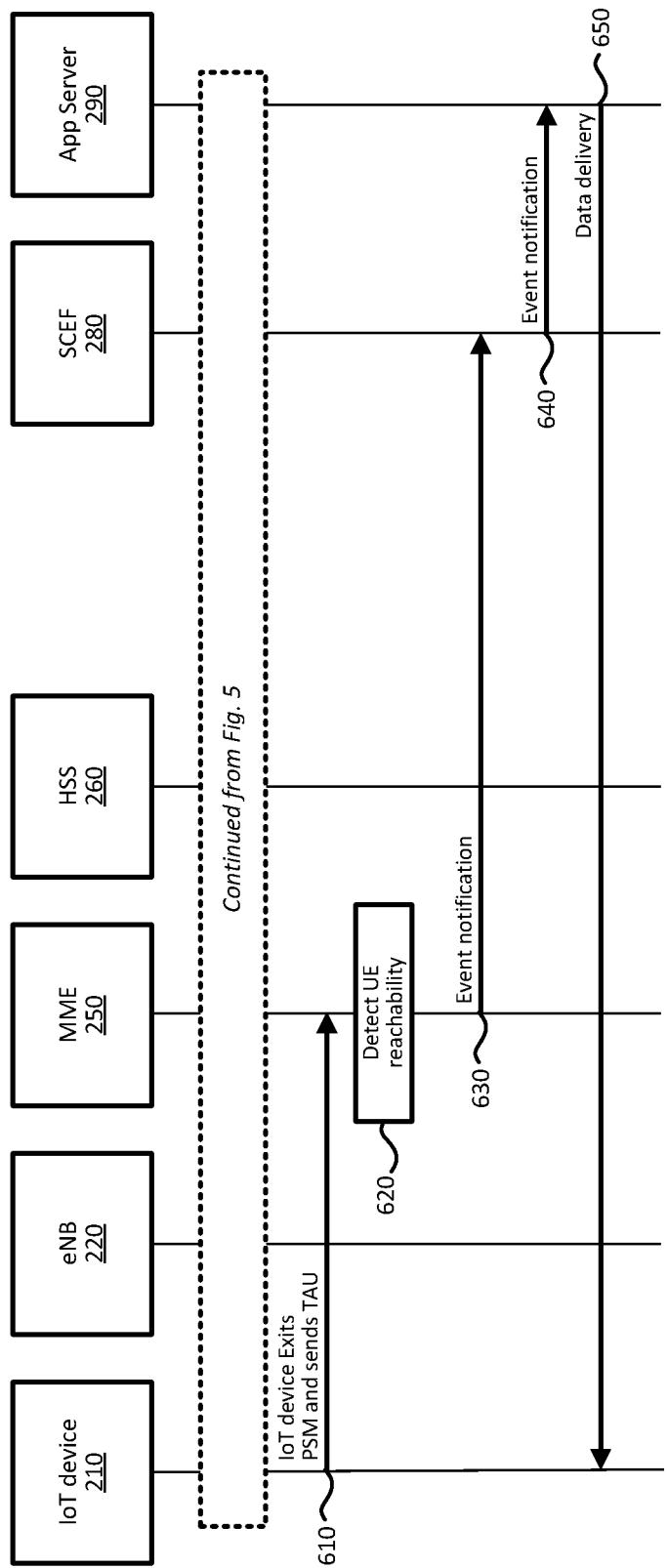

FIGS. 5 and 6 are diagrams of an example for providing IoT group registration and notification services. As shown, FIGS. 5 and 6 include IoT device 210, eNB 220, MME 250, HSS 260, BSS 510, enterprise GW 520, and app server 290. Examples of these devices are discussed above with reference to FIG. 2.

As shown, a user or operator of app server 290 may communicate with HSS 260, BSS 510, and enterprise GW 520 to create a subscription to receive notifications for events that correspond to a group of IoT devices (block 512). The notification subscription may include an enterprise ID, an IoT device group ID, and IoT device information. The enterprise ID may include a name, an assigned ID, a customer code, etc., of the organization requesting the notification services. The IoT device group ID may be a unique identifier for the particular group of IoT devices. The IoT device information may include an ID (e.g., an MDN) for each IoT device 210. In some implementations, a single app server 290 may be in charge of one or more groups of IoT devices. Enterprise gateway 520 may provide application server 290 with a portal for registering the IoT device group while BSS 510 may provide charging services to ensure that the customer requesting the notification subscription is properly billed. The notification subscription may be stored in HSS 260.

In some implementations, app server 290 may communicate with enterprise GW 520, BSS 510, and/or HSS 260 to modify the notification subscription (block 520). For example, the customer billing information may be updated by communicating with BSS 510. Additionally, the notification subscription may be changed, which may include adding and/or removing IoT devices 210 to/from the notification subscription, in addition to altering the information of any of the IoT devices 210 already part of the notification subscriptions. Changes to the notification subscription may be stored by HSS 260. In some implementations, changes to the notification subscription may be made at any point during the life of the notification subscription.

IoT devices 210 may be deployed within a wireless telecommunication network, which may result in each IoT device 210 engaging in an attach procedure to connect to the network (block 530). The attach procedure may include an attach procedure as described by the 3GPP Communication Standard or other communication standards or protocols. As shown, during the attach procedure, a subscription profile may be provided from HSS 260 to MME 250 (line 540). This may include HSS 260 communicating the notification subscription to MME 250 (e.g., an IoT device group ID, an SCEF ID, and IoT device information). For example, if IoT device is part of a group, HSS 260 may send all of the notification subscription information (e.g., an IoT device group ID, an SCEF ID, and IoT device information). By contrast, if IoT device 210 is not part of a group, HSS 260 may only send IoT device information). In some implementations, this information may be sent to MME 250 during a Update Location Request and Update Location Answer exchange between MME 250 and HSS 260. In some implementations, different IoT devices 210 of the group of IoT devices may be deployed in different geographic locations, such that the IoT devices 210 may be attached to different MMES 250. In such implementations, HSS 260 may provide each MME 250 with a complete copy of the notification subscription.

During the attach procedure (block 530), MME 250 may send a notification to SCEF 280 that IoT device 210 is available to receive information (line 550). In some implementations, this may be done via an IP PDN or a non-IP PDN, as provided in the 3GPP Communication Standard. In response, SCEF 280 may map the notification message to an external device, such as app server 290 (block 560). Additionally, SCEF 280 may notify app server 290 that IoT device 210 is available to receive information (line 570). In response, app server 290 may initiate a data delivery operation that includes information that app server 290 would like to provide to IoT device 210 (line 575). In some implementations, app server 290 may do so by using an IP PDN (e.g., through PGW 240, SGW 230, and eNB 220) or by using a non-IP PDN (e.g., through SCEF 290, MME 250, and eNB 220). As shown, at some point in time, IoT device 210 may enter a PSM and/or another type of mode of operation where IoT device 210 is unavailable to send and/or receive information from app server 290 (block 580).

Referring now to FIG. 6, at some point in time, IoT device 210 may exit the PSM and may send a TAU to eNB 220 (line 610). The TAU may be detected by MME 250. MME 250 may detect the TAU as an IoT device event as defined by the notification subscription (block 620). In response, MME 250 may send an event notification to SCEF 280, and SCEF 280 may notify app server 290 that IoT device 210 is available (line 640). In response to the event notification, app server 290 may communicate information to IoT device 210 (line 650). In some implementation, app server 290 may do so by using an IP PDN (e.g., through PGW 240, SGW 230, and eNB 220) or by using a non-IP PDN (e.g., through SCEF 290, MME 250, and eNB 220).

Figure 7:
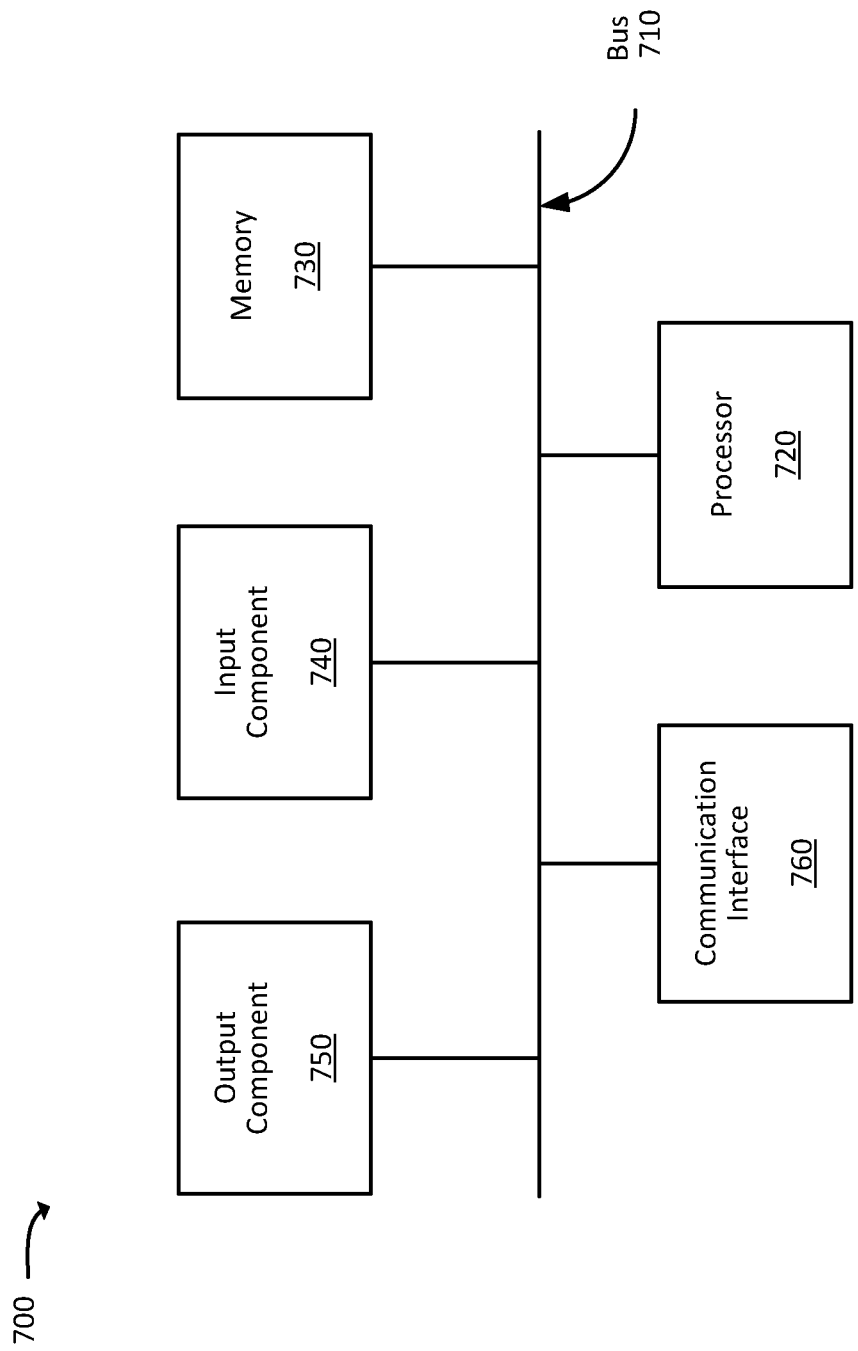
FIG. 7 is a block diagram of example components of a device.

FIG. 7 is a diagram of example components of a device 700. Each of the devices illustrated in FIGS. 1, 2, 5, and 6 may include one or more devices 700. Device 700 may include bus 710, processor 720, memory 730, input component 740, output component 750, and communication interface 760. In another implementation, device 700 may include additional, fewer, different, or differently arranged components. As described herein, a component may be implemented by hardware circuitry, software logic, and/or some combination thereof.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1 and 3-6 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
    one or more non-transitory memory devices storing a plurality of processor-executable instructions; and one or more processors configured to execute the processor-executable instructions, wherein executing the processor-executable instructions causes the one or more processors to:
    receive an identification of a plurality of Internet-of-Things (IoT) devices that are configured to communicate via a wireless telecommunication network;
    receive an indication of a particular application server that is associated with a first set of IoT devices,
    the first set of IoT devices being a subset of the plurality of IoT devices,
    the first set of IoT devices including two or more IoT devices of the plurality of IoT devices,
    wherein the association indicates that the particular application server is to be notified when one or more IoT devices, in the first set of IoT devices, becomes available to communicate via the wireless telecommunications network;
    detect that a particular IoT device, of the first set of IoT devices, has transitioned from being unavailable to communicate via the wireless network, to being available to communicate via the wireless network;
    in response to detecting that the particular IoT device has transitioned from being unavailable to communicate to being available to communicate:
        select the particular application server, from a plurality of candidate application servers, based on identifying that the particular application server is associated with the first set of IoT devices, which includes the particular IoT device; and
        notify the selected particular application server that the particular IoT device, of the first set of IoT devices, is available to receive information,
        whereby notifying the selected particular application server causes the particular application server to transmit information to the particular IoT device while the particular IoT device is available to communicate via the wireless telecommunication network.

2. The system of claim 1, wherein:
    when the particular IoT device is unavailable to communicate via the wireless telecommunication network, the IoT device is in a Power Saving Mode (PSM); and
    the particular IoT device is available to communicate via the wireless telecommunications when the IoT device exits the PSM.

3. The system of claim 2, wherein:
    the particular IoT device is available to communicate via the wireless telecommunications when the particular IoT device performs a Tracking Area Update (TAU) procedure after being in the PSM.

4. The system of claim 1, wherein:
    a Home Subscriber Server (HSS), of the wireless telecommunication network, stores the indication of the particular application server that is associated with the first set of IoT devices; and
    the HSS provides the profile to a Mobility Management Entity (MME) to which the particular IoT device, of the first set, connects as part of an attach procedure with the wireless telecommunication network.

5. The system of claim 4, wherein, the MME notifies the selected application server that the particular IoT device has become available by notifying a Service Capability Exposure Function (SCEF), of the wireless telecommunication network, that the particular IoT device has become available to communicate.

6. The system of claim 5, wherein, to notify the particular application server, the SCEF communicates a notification to the particular application server based on a mapping, by the SCEF, of the particular IoT device to the application server.

7. The system of claim 1, wherein the particular application server is a first application server, wherein executing the processor-executable instructions, to select the particular application server from the plurality of candidate application servers, further causes the one or more processors to:
    receive an indication that a second application server, of the plurality of candidate application servers, is associated with another IoT device, of the plurality of IoT devices;
    detect that the other IoT device has transitioned from being unavailable to communicate via the wireless telecommunications network, to being available; and
    notify, based on detecting that the other IoT device has become available, the second application server that the other IoT device has become available.

8. A method, comprising:
receiving, by one or more devices, an identification of a plurality of Internet-of-Things (IoT) devices that are configured to communicate via a wireless telecommunication network;
receiving, by the one or more devices, an indication of a particular application server that is associated with a first set of IoT devices,
the first set of IoT devices being a subset of the plurality of IoT devices,
the first set of IoT devices including two or more IoT devices of the plurality of IoT devices,
wherein the association indicates that the particular application server is to be notified when one or more IoT devices, in the first set of IoT devices, becomes available to communicate via the wireless telecommunications network;
detecting, by the one or more devices, that a particular IoT device, of the first set of IoT devices, has transitioned from being unavailable to communicate via the wireless network, to being available to communicate via the wireless network;
in response to detecting that the particular IoT device has transitioned from being unavailable to communicate to being available to communicate:
selecting, by the one or more devices, the particular application server, from a plurality of candidate application servers, based on identifying that the particular application server is associated with the first set of IoT devices, which includes the particular IoT device; and
notifying, by the one or more devices, the selected particular application server that the particular IoT device, of the first set of IoT devices, is available to receive information,
whereby notifying the selected particular application server causes the application server to transmit information to the particular IoT device while the particular IoT device is available to communicate via the wireless telecommunication network.

9. The method of claim 8, wherein:
when the particular IoT device is unavailable to communicate via the wireless telecommunication network, the particular IoT device is in a Power Saving Mode (PSM); and
particular the IoT device is available to communicate via the wireless telecommunications when the IoT device exits the PSM.

10. The method of claim 9, wherein:
the particular IoT device is available to communicate via the wireless telecommunications when the particular IoT device performs a Tracking Area Update (TAU) procedure after being in the PSM.

11. The method of claim 8, further comprising:
storing, by a Home Subscriber Server (HSS) of the wireless telecommunication network, the indication of the particular application server that is associated with the first set of IoT devices; and
providing, by the HSS, the profile to a Mobility Management Entity (MME) to which the particular IoT device, of the first set, is connected as part of an attach procedure with the wireless telecommunication network.

12. The method of claim 11, wherein the MME notifies the selected application server that the particular IoT device has become available by notifying a Service Capability Exposure Function (SCEF), of the wireless telecommunication network, that the particular IoT device has become available to communicate.

13. The method of claim 12, wherein, to notify the particular application server, the SCEF communicates a notification to the particular application server based on the mapping of the particular IoT device to the particular application server.

14. The method of claim 8, wherein the particular application server is a first application server, the method further comprising:
receiving an indication that a second application server, of the plurality of candidate application servers, is associated with another IoT device, of the plurality of IoT devices;
detecting that the other IoT device has transitioned from being unavailable to communicate via the wireless telecommunications network, to being available; and
notifying, based on detecting that the other IoT device has become available, the second application server that the other IoT device has become available.

15. A non-transitory, computer readable medium storing a plurality of processor-executable instructions, wherein executing the processor-executable instructions causes one or more processors to:
receive an identification of a plurality of Internet-of-Things (IoT) devices that are configured to communicate via a wireless telecommunication network;
receive an indication of a particular application server that is associated with a first set of IoT devices, the first set of IoT devices being a subset of the plurality of IoT devices,
the first set of IoT devices including two or more IoT devices of the plurality of IoT devices,
wherein the association indicates that the particular application server is to be notified when one or more IoT devices, in the first set of IoT devices, becomes available to communicate via the wireless telecommunications network;
detect that a particular IoT device, of the first set of IoT devices, has transitioned from being unavailable to communicate via the wireless network, to being available to communicate via the wireless network;
in response to detecting that the particular IoT device has transitioned from being unavailable to communicate to being available to communicate:
select the particular application server, from a plurality of candidate application servers, based on identifying that the particular application server is associated with the first set of IoT devices, which includes the particular IoT device; and
notify the selected particular application server that the particular IoT device, of the first set of IoT devices, is available to receive information,
whereby notifying the selected particular application server causes the application server to transmit information to the particular IoT device while the particular IoT device is available to communicate via the wireless telecommunication network.

16. The non-transitory memory device of claim 15, wherein:
when the particular IoT device is unavailable to communicate via the wireless telecommunication network, the particular IoT device is in a Power Saving Mode (PSM); and the particular IoT device is available to communicate via the wireless telecommunications when the IoT device exits the PSM.

17. The non-transitory memory device of claim 16, wherein:
the particular IoT device is available to communicate via the wireless telecommunications when the particular IoT device performs a Tracking Area Update (TAU) procedure after being in the PSM.

18. The non-transitory memory device of claim 17, wherein:
a Home Subscriber Server (HSS), of the wireless telecommunication network, stores the indication of the particular application server that is associated with the first set of IoT devices; and
the HSS provides the profile to a Mobility Management Entity (MME) to which the particular IoT device, of the first set, connects as part of an attach procedure with the wireless telecommunication network.

19. The non-transitory memory device of claim 18, wherein, the MME notifies the selected application server that the particular IoT device has become available by notifying a Service Capability Exposure Function (SCEF), of the wireless telecommunication network, that the particular IoT device has become available to communicate.

20. The non-transitory computer-readable medium of claim 15, wherein the particular application server is a first application server, wherein the processor-executable instructions, to select the application server from the plurality of candidate application servers, include processor-executable instructions to:
receive an indication that a second application server, of the plurality of candidate application servers, is associated with another IoT device, of the plurality of IoT devices;
detect that the other IoT device has transitioned from being unavailable to communicate via the wireless telecommunications network, to being available to communicate; and
notify, based on detecting that the other IoT device has become available, the second application server that the other IoT device has become available.

* * * * *